United States Patent [19]
Warzecha

[11] Patent Number: 5,836,336
[45] Date of Patent: Nov. 17, 1998

[54] CUT-OFF DIAPHRAGM GATE VALVE

[76] Inventor: Henryk Warzecha, ul. 1-szego Maja 88, 32-332 Bukowno, Poland

[21] Appl. No.: 879,001

[22] Filed: Jun. 19, 1997

[51] Int. Cl.[6] ..................................................... F16R 1/18
[52] U.S. Cl. ............................................. 137/15; 251/302
[58] Field of Search .............................. 137/15; 251/250, 251/250.5, 301, 302, 367

[56] References Cited

U.S. PATENT DOCUMENTS

| | | | |
|---|---|---|---|
| 1,099,200 | 6/1914 | Patterwon | 251/301 |
| 1,617,503 | 2/1927 | Seymour et al. | 251/302 X |
| 3,045,706 | 7/1962 | Dillon | 251/301 X |
| 3,512,751 | 5/1970 | Fitzgerald | 251/302 |
| 3,659,822 | 5/1972 | Nagy | 251/302 X |
| 3,788,346 | 1/1974 | Fitzgerald | 251/302 X |
| 3,837,356 | 9/1974 | Selep et al. | 251/302 X |
| 4,543,981 | 10/1985 | Bates et al. | 251/302 X |

Primary Examiner—John Rivell
Attorney, Agent, or Firm—Horst M. Kasper

[57] ABSTRACT

A cut-off diaphragm gate valve has two members (1) of the shape of a quadrangle located opposite to each other as in mirror reflection. Passage openings (4) are disposed in the four corners of each of the members (1). Control screws (5) furnished with nuts (6) and washers (7) are inserted in the passage openings (4). The control screws (5) hold the two members (1) together and place the two members (1) in the proper relative position. Threaded attachment openings (8) made in each of the two members (1) serve for connecting the cut-off diaphragm gate valve to the liquid transport installation. Each of the two members is in part immersed in a profiled gasket (9) vulcanized together with each of the members (1). A profiled diaphragm (19) is nested between the profiled gaskets (9). The profiled diaphragm is seated rotatably on a fixed pin (18). A regulating and limiting pin (27) is located at a side edge (26) of the diaphragm (19) for establishing an open position of the cut-off diaphragm gate valve.

16 Claims, 7 Drawing Sheets

CUT-OFF DIAPHRAGM GATE VALVE

BACKGROUND OF THE INVENTION

1. Field of the Invention

The subject of the present invention is a cut off diaphragm gate valve which is employed for pipelines in installations of liquid transport and pneumatic transport of loose material.

2. Brief Description of the Background of the Invention Including Prior Art

Presently known sliding gate valves, made by the Zaklady Metalowe in Krapkowice, Poland, comprise a rectangular casing which is constructed such that the rectangular casing exhibits a groove in the shape of the letter "U" on the outside creating sliding guide shears for the cooperating rectangular slider gate valve. The gate valve is furnished with a packing shaft with bearings. The packing shaft runs upwardly and is ending on the top with a crank or a handwheel. The packing shaft provides simultaneously a traction screw which opens or closes the gate valve located in the sliding guide shears.

A disadvantage of the known gate valve with slider is that solid parts, such as sand, stones and the like, are collecting and accumulating in the lower part of the sliding guide shears. The solid parts do not allow a further complete closing of the gate valve after a certain time of use, thereby this gate valve loses its sealing capacity.

A wedge-shaped gate valve, made by Bielska Fabryka Armatur "Befa" in Bielsko-Biala, Poland, is further known. This wedge-shaped gate valve has a cast member with an internally constructed conical brass sleeve provided with an oval-shaped passage openings in the axis of the medium flow-through. A conical wedge-shaped seat is provided in the articulated sleeve, where the lower part of the wedge-shaped seat is slidingly placed in a pivot seat. The conical wedge-shaped seat is furnished with a driving shaft with the packed bearings at the top. A round handwheel or a terminal shaft is seated on the top part of the drive shaft with round hand wheel or terminal shaft. The terminal shaft is furnished with an end which is prepared for a key or a crank.

The disadvantage of the applied solution is a low resistance to liquid abrasion. Additionally, solid contamination accumulates under the seat and above the wedge-shaped seat which leads to a loss of sealing capacity or sealing effectiveness of the gate valve. The solid contamination makes it impossible for the gate valve to open completely or to close completely because a so-called seizing effect occurs on the elements of the sliding support.

SUMMARY OF THE INVENTION

1. Purposes of the Invention

It is an object of the present invention to provide a cut-off diaphragm gate valve which provides high assurance of closing and opening under the flow through of the transported material mixed with water or air.

It is another object of the present invention to provide a cut-off diaphragm gate valve which shows substantial resistance to abrasion.

It is yet a further object of the present invention to provide a cut-off diaphragm gate valve which needs only low maintenance.

These and other objects and advantages of the present invention will become evident from the description which follows.

2. Brief Description of the Invention

The present invention provides for a cut-off diaphragm gate valve. A first annular member includes an inner part and an outer part. A first annular gasket includes a first outer part, a first inner cylindrical surface with a first inner end and a first outer end. The first inner part of the first annular member is embedded in the first outer part of the first annular gasket. First attachment means are disposed in the first outer part of the first annular member. A first sealing lip is disposed at the first inner end of the of the first annular gasket. A second annular member includes a second inner part and a second outer part. A second annular gasket includes a second outer part, a second inner cylindrical surface with a second inner end and a second outer end. The second inner part of the second annular member is embedded in the second outer part of the second annular gasket. Second attachment means are disposed in the second outer part of the second annular member. Joining means are attached to the first attachment means and to the second attachment means for holding the first annular member at a defined distance relative to the second annular member. A second sealing lip is disposed at the second inner end of the of the second annular gasket. The first sealing lip engages the second sealing lip in an open position of the valve such that a flow can pass through an interior open space of the first annular gasket and through an interior open space of the second annular gasket. A fixed hinge pin is attached between the first annular member and the second annular member and is aligned in parallel to a common axis of the first annular gasket and of the second annular gasket. A diaphragm having a hinge opening is disposed surrounding the fixed hinge pin and is disposed between the first inner end of the first annular gasket and the second inner end of the second annular gasket and has a cylindrical opening disposed such that, in a first position of the diaphragm, the cylindrical opening is aligned with the first sealing lip and with the second sealing lip so as to allow a flow through a circular opening defined by the first sealing lip and the second sealing lip and such that in a second position of the diaphragm a solid plate is disposed between the first sealing lip and the second sealing lip such as to prevent a flow through a circular obstruction formed by the diaphragm between the first sealing lip and the second sealing lip.

The first attachment means can be furnished by a first borehole aligned parallel to the common axis. The second attachment means can be furnished by a second borehole aligned parallel to the common axis. The regulating screw can pass through the first borehole and through the second borehole. The regulating screw can be fastened by the nuts. Alternatively, the second attachment means can be furnished by a second threaded borehole aligned parallel to the common axis. In this case, the regulating screw can pass through the first borehole and can be threaded into the second borehole. The regulating screw can then be fastened by the nuts.

The first annular member and the second annular member can be of a shape of a quadrangle having a mirror plane. The first annular member and the second annular member can be disposed opposite to each other. The first annular gasket can be vulcanized to the first annular member and the second annular gasket can be vulcanized to the second annular member. The diaphragm can be seated rotatably around the fixed hinge pin. A joining member can be provided for connecting the first attachment means to the second attachment means. A limiting stop can be disposed on the diaphragm for engaging the joining member to limit a rotation of the diaphragm around the fixed hinge pin. A mirror plane can be disposed between the first annular member and the second annular member such that the second annular member is substantially a mirror image of the first annular member.

First mounting means can be disposed in the outer part of the first annular member. A first flat outer front surface can be furnished at an outer end of the first annular gasket and can extend parallel to the common axis. A first annular head projection can be furnished at a first inner end of the first annular member and can have a shape of a first ring-shaped orifice. A first circumferential groove can be disposed in the first ring-shaped orifice. Second mounting means can be disposed in the outer part of the second annular member. A second flat outer front surface can be furnished at an outer end of the second annular gasket and can extend parallel to the common axis. A second annular head projection can be furnished at a second inner end of the second annular member and can have a shape of a second ring-shaped orifice. A second circumferential groove can be disposed in the second ring-shaped orifice.

A central passage opening can be defined by the first annular gasket and by the second annular gasket. A first outer cylindrical collar can be furnished at the first annular gasket. The first outer cylindrical collar can be disposed farther away from the first sealing lip in an axial direction as compare to a position of the first flat outer front surface. A first flat inner cylindrical collar can be furnished at the first annular gasket. The first flat inner cylindrical collar can be disposed close to the first sealing lip in an axial direction as compared to a position of the first annular head projection. A first ring-shaped tongue of the first annular gasket can be disposed in the first circumferential groove. A second outer cylindrical collar can be furnished at the second annular gasket. The second outer cylindrical collar can be disposed farther away from the second sealing lip in an axial direction as compared to a position of the second flat outer front surface. A second flat inner cylindrical collar can be furnished at the second annular gasket. The second flat inner cylindrical collar can be disposed close to the second sealing lip in an axial direction as compared to a position of the second annular head projection. A second ring-shaped tongue of the second annular gasket can be disposed in the second circumferential groove.

A first "V"-shaped circumferential groove can be provided for forming the first sealing lip on a surface of the first flat inner cylindrical collar. The first sealing lip can slightly protrude above the surface of the first flat inner cylindrical collar. A second "V"-shaped circumferential groove can be provided for forming the second sealing lip on a surface of the second flat inner cylindrical collar. The second sealing lip can slightly protrude above the surface of the second flat inner cylindrical collar.

A first cylindrical casting opening can be disposed in the first annular member and can be connected to the first circumferential groove. A first cast ingot can be disposed in the first cylindrical casting opening and can be attached to the first annular gasket. A second cylindrical casting opening can be disposed in the second annular member and can be connected to the second circumferential groove. A second cast ingot can be disposed in the second cylindrical casting opening and can be attached to the second annular gasket.

The diaphragm can exhibit a uniform thickness. A distance between the first flat inner cylindrical collar furnished at the first annular gasket and the second flat inner cylindrical collar furnished at the second annular gasket can be from about 0.95 to 1.0 times the thickness of the diaphragm.

A diameter of the cylindrical opening of the diaphragm can be equal to an inner diameter of the first annular gasket and of the second annular gasket. An outer edge disposed at the diaphragm can extend on one periphery of the diaphragm with a curvature like an ellipse and on an oppositely disposed periphery of the diaphragm with a straight and angled periphery. A handle can be attached to the diaphragm and can join both the periphery of the diaphragm with a curvature like an ellipse and the oppositely disposed periphery of the diaphragm with a straight and angled periphery. Oblique bevels can surround the cylindrical opening of the diaphragm. The oblique bevels can extend sealingly locking sealing surfaces of the sealing lip.

A diameter of the cylindrical opening of the diaphragm can be equal to 1.001 to 1.02 times an inner diameter of the first annular gasket and of the second annular gasket. An outer edge disposed at the diaphragm can extend on one periphery of the diaphragm with a curvature like a segment of a circle, and on an oppositely disposed periphery of the diaphragm with a straight and angled periphery. A handle can be attached to the diaphragm and can join both the periphery of the diaphragm with a curvature like an ellipse and the oppositely disposed periphery of the diaphragm with a straight and angled periphery. Dual bevels can adjoin each other and can surround the cylindrical opening of the diaphragm. The bevels can form an angle of from about 10 to 50 degrees with a plane disposed perpendicular to the common axis.

The basis of the present invention rests in the construction of the gate valve formed from two members which have the shape of a delta and which are located opposite to each other such as in mirror reflection. Each of the members is equipped with a profiled gasket vulcanized to the member. A profiled diaphragm is disposed between the gaskets which profiled diaphragm is seated rotatingly on a fixed pin. A controlling and limiting pin is provided on the lateral edge of the profiled diaphragm. Each member is provided with a flat front face at one side and with a head projection in the form of a ring-shaped orifice at the second side. A circumferential groove is furnished in the ring-shaped orifice. The profiled gasket is provided with a central passage opening and with cylindrical collars disposed at both sides of the central passage opening. The cylindrical collars are correspondingly placed above the flat front face assigned to one of them and above the head projection formed in each of the members. One cylindrical collar of the profiled gasket is provided with a ring-shaped tongue, which ring-shaped tongue is seated solidly in the circumferential groove coordinated to it and located in the member. Furthermore, the profiled gasket is provided with a circumferential groove having the cross-section of the letter "V", where the circumferential groove is furnished in a surface of the central passage opening and is located near an edge of the central passage opening which is disposed at the profiled diaphragm. The circumferential groove helps to form a sealing lip. The sealing lip projects very little above a flat surface of the cylindrical collar. The profiled diaphragm has a cylindrical opening of a diameter which is equal to a diameter of the central passage opening in the gasket. The profiled diaphragm has an edge in a form of an ellipse at one side which joins with a first edge of the handle, and the profiled diaphragm has straight and broken edges on the second side which broken edge further joins also with a second edge of the handle.

The cut-off diaphragm gate valve according to the present invention assures always a positive and leakproof closing or opening of the flow-through of transported medium in the installation since the sealing lip of the profiled gasket scrapes the sludge from the diaphragm at the time of the motion of the diaphragm, which sludge can be flushed by a flow of water or by compressed air. The construction according to the present invention shows furthermore a high resistance to abrasion by the transported loose material. Furthermore, the gaskets are molded by the way of vulcanization together with the member and, as a result, the diaphragm is sealed very effectively. The invention construction is simple to manufacture and does not require any maintenance and the invention construction is in addition directed to the handle of the diaphragm, connected to the servo motor, and where the diaphragm is thereby controlled by the servo motor in an automatic mode of operation.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention.

DESCRIPTION OF INVENTION AND PREFERRED EMBODIMENT

The present invention provides for a cut-off diaphragm gate valve furnished with regulating screws with nuts, washers and a fixed pin. The gate valve has two members 1 of a shape of a quadrangle and located opposite to each other in mirror image. Said members 1 are in part immersed in a profiled gasket 9. Said gasket 9 is vulcanized together with the members 1, with a profiled diaphragm 19 nested between them. The diaphragm 19 is seated rotatably on the fixed pin 18. A regulating and limiting pin 27 is located at a side edge 26 of the diaphragm 19.

Each one of the two members 1 can be furnished at one side with a flat front face 2 and at a second side with a head projection 3 in a form of a ring-shaped orifice. A circumferential groove 14 can be disposed in the ring-shaped orifice.

The profiled gasket 9 can include a central passage opening 10 and an outer cylindrical collar 11 and an inner cylindrical collar 12. Said cylindrical collars 11 and 12 can correspondingly be disposed at the flat front face 2 coordinated to them and above the head projection 3 in the member 1 at which the cylindrical collar 12 contains a ring-shaped tongue 13. Said ring-shaped tongue 13 can be fixedly seated in the groove 14 assigned to the ring-shaped tongue 13. Said groove 14 can be disposed in the member 1. The gasket 9 can be furnished with a circumferential groove 16 having a cross-sectional form of the letter "V". A sealing lip 17 can be furnished on the surface of the circumferential collar 12. Said sealing lip 17 slightly protrudes above the inner flat surface of the cylindrical collar 12.

The profiled diaphragm 19 can exhibit a cylindrical opening 23 of a diameter equal to a diameter of the central passage opening 10 in the profiled gasket 9. The diaphragm 19 can exhibit a profiled outer edge 24 extending on one side, which is curved as an ellipse, into a handle 25 and can have straight and broken edges 26 on a second side extending also into the handle 25. Oblique bevels 28 can be disposed around the cylindrical opening 23 of the diaphragm 19. The oblique bevels 28 can extend sealingly locking a sealing surface of the sealing lip 17.

A cut-off diaphragm gate valve is composed of two metallic and oppositely disposed members 1 having a shape of a quadrangle with a mirror plane, wherein each member 1 exhibits at a first side a flat front face 2 and exhibits at a second side a head projection 3 in the shape of ring orifice. Passage openings 4 are disposed in the four corners of each of the members 1. The passage openings 4 serve for locating therein the control screws 5 furnished with nuts 6 and washers 7, whereas threaded attachment openings 8 made in the head projection 3 serve for connecting the valve to the liquid transport installation with the aid of pin screws, not illustrated. The attachment openings 8 are disposed on a circle having its center at the center of a connection line between two oppositely disposed corners. The positions of the attachment openings 8 are generally defined by the industrial standards relating to the piping to be connected to the valve of the present invention. The control screws 5 hold the two members 1 together and place them into a proper relative position. The control screws 5 can be fastened with nuts or, alternatively, the passage openings 4 can be provided with threads.

Preferably, the member 1 has the shape of a body with four substantially straight edges. The edges are joined at the corners to exhibit the shape of a deformed square. Preferably, two oppositely disposed angles of 90° are provided and preferably the angles of the remaining two opposite corners counted together amount to about 180°. The angle of these individual corners can be from about 50° to 70° and, respectively, from 110° to 130°.

Preferably, the member 1 is made of a metal inert to the liquids and gases in connection with which the valve is used even though, under standard conditions, the liquids or gases will not contact the member 1. Such materials include iron, steel, copper and aluminum. Preferably, the member 1 is produced by casting.

Each of the members 1 is furnished with a profiled gasket 9 made up of polyurethane, which profiled gasket 9 is durably formed in a final form by a vulcanization method in a mold together with the member 1. It is important that the gasket 9 exhibits suitable elastic properties which allows the lip 17 to operate as sealing lip. Such gaskets can be produced from a polyurethane designated as Epunity NPM and furnished by Boloil S.A., 32-332 Bukowno, Poland. Such material preferably has a density gamma of from about 1.2 to 1.4 kilogram per cubic decimeter, and preferably of from 1.22 to 1.3 kilogram per cubic decimeter. Such material further preferably exhibits a grindability delta V of up to 18 millimeters according to industrial standard DIN 53516. The hardness H of the gasket material is preferably higher than 67°+5° ShA according to Industrial Standard DIN 53519. The elastic strength of the gasket material is preferably above 30 MPa and more preferred 41 MPa or higher according to Standard PN-71/C-04205. Furthermore, the material of the gasket 9 has to be resistant to the medium to be transported through the valve in a chemical sense as well as in a mechanical sense. The profiled gasket 9 is formed in such way that it contains a central circular passage opening 10 defining an axis 136 and exhibiting an outer cylindrical collar 11 and an inner cylindrical collar 12, wherein the outer cylindrical collar 11 correspondingly protrudes above the outer, preferably in part flat, front face 2 and the head projection 3 of the member 1, and wherein the inner cylindrical collar 12 protrudes above the inner front face 102 of the member 1.

The member 1 is disposed preferably on a circle around the axis 136 and furnished inside of the passage openings 4, of the opening 22, and of the threaded attachment openings with from about 3 to 12, and preferably from 5 to 8 cylindrical openings 113 extending parallel to the axis 136. The cylindrical openings 113 allow an escape of air and a flow of the viscous fluid through the cylindrical opening 113 of the member 1 during casting of the profiled gasket 9 around the member 1. The inner cylindrical collar 12 of the profiled gasket 9 has a ring-shaped tongue 13 solidly seated in a circumferential groove 14 provided for the ring-shaped tongue 13. The ring-shaped tongue 13 is furnished with extensions anchored in the cylindrical openings 113. The cylindrical openings 113 thus prevent a mutual rotation between the profiled gasket 9 and the member 1 and assure a stable configuration of the profiled gasket 9 inside of the member 1. The outer cylindrical collar 11 is connected with the inner cylindrical collar 12 by way of cylindrical ingots 15 in form of cylindrical pins formed during vulcanization of the profiled gasket 9 to the member 1. The cylindrical ingots 15 prevent a separation of the gasket from the member 1 even at very high pressures, which occur in an installation for controlling the flow of liquids. The profiled gasket 9 is furnished with a circumferential groove 16, which circumferential groove 16 in a cross-sectional view exhibits the shape of the letter "V". A sealing lip 17 is provided on the surface of the cylindrical collar 12, which sealing lip 17 projects very little above the flat surface of the cylindrical collar 12.

A sliding profiled diaphragm 19 is placed between the inner cylindrical collars 12 of the profiled gaskets 9. The profiled diaphragm 19 is provided with a cylindrical opening 23 of a diameter substantially equal to or slightly larger than a diameter of the central circular passage opening 10 of the profiled gasket 9. The cylindrical opening 23 is furnished with a dual bevelling at the inner edge of the cylindrical opening 23. The radius of the cylindrical opening 23 of the diaphragm 19 is from 1.0 to 3.0 times and preferably 1.5 to 2.0 the thickness of diaphragm 19. The valve operates best when two alternating positions of the valve, that is open and closed, are employed and no intermediate positions of the diaphragm 19 between open and closed are required. The open position of the diaphragm 19 is defined with a limiting pin 27 or a limiting screw. For a precise alignment of the diaphragm 19 to the axis 136, the side of the diaphragm 19, facing the limiting pin 27 or screw, is milled to provide a proper position. Thereby a coaxial position of the cylindrical opening 23 of the diaphragm 19 and of the sealing lip 17 of the profiled gasket 9 is defined. The hardness of the material of the diaphragm can be from about 65 to 75 Shur. The diaphragm is preferably produced from stainless steel to avoid corrosion. The diaphragm 19 can further be furnished with a surface coating resistant to the fluids passing through the valve.

The sliding profiled diaphragm 19 is seated with the aid of a fixing pin 18, which fixing pin 18 is inserted in an opening 20 furnished in the sliding profiled diaphragm 19. The fixing pin 18 provides a rotation axis for the diaphragm 19. The fixing pin 18 is seated with the negative allowance in an opening 21 made in one of the members 1 and is slidingly seated in the opening 22 in the second of members 1.

The shape of the member 1 is selected such the diaphragm 19 can swing for joining the member 1, wherein two joining sides are disposed next to the small corner angle of the member 1. The overall structure of the diaphragm 19 has the shape of a bean or the shape of a kidney.

The width of the circumferential groove 16 in the area of the inner surface of the profiled gasket 9 is from about 0.9 to 1.1 times the thickness of the diaphragm 19. The shaped groove has an angle at its bottom of from about 20° to 40°. The distance between the inner edge of the profiled gasket 9 joining the second gasket from the neighboring corner of the circumferential groove 16 is from about 0.5 to 1.5 times the thickness of the diaphragm 19 and preferably from about 0.8 to 1.2 times the thickness of the diaphragm 19. The depth of the circumferential groove 16 is from about 1.0 to 2.0 times the width of the circumferential groove 16 at the inner cylindrical wall of the profiled gasket 9. The faces in axial direction of the outer cylindrical collar 11 of the profiled gasket 9 is formed to provide a seal together with the adjoining pipe structure and the faces in axial direction preferably exhibit a flat plane structure disposed perpendicular to the axis 136 of the profiled gasket 9.

The control screws 5 and the associated nuts 6 serve to position the members 1 such that their relative position is such as to enable the diaphragm 19 to slide toward the middle such that a seal is provided at the edges of the profiled gaskets 9 disposed next to each other in the area of the passage opening 10 independent of the position of the diaphragm 19. The diaphragm 19 is disposed such that the distance between the edges of the profiled gaskets at the outer periphery corresponds substantially to the thickness of the diaphragm 19. In the absence of diaphragm 19 at the inner joining of the gaskets 9, the conical or bevelled inner ring edges of the gaskets 9 are contacting each other sealingly.

A preferred embodiment provides that a first one of the members 1 has the passage openings 4 furnished with threads and a second member 1 furnished with cylindrical holes, and wherein each of the ends of each cylindrical hole is neighbored by a nut holding the second member in proper position relative to the first member. This construction allows for an easy adaptation of the distances between the members 1 and also the respective profiled gaskets 9, thereby providing proper sealing properties of the profiled gaskets 9 in the area facing the diaphragm 19.

Figure 1:
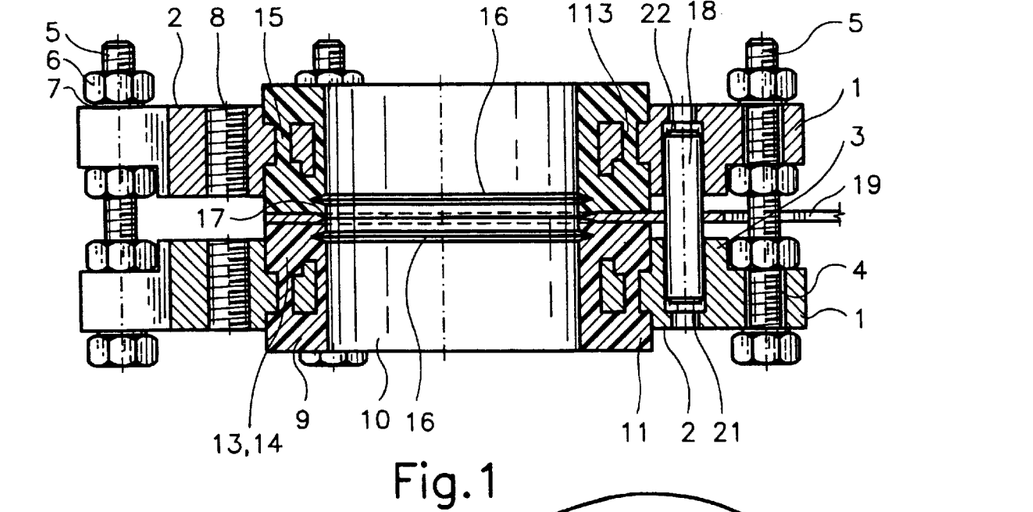
FIG. 1 shows a cross-sectional view of a cut-off diaphragm gate valve along a section line 1—1 of FIG. 2.
Figure 2:
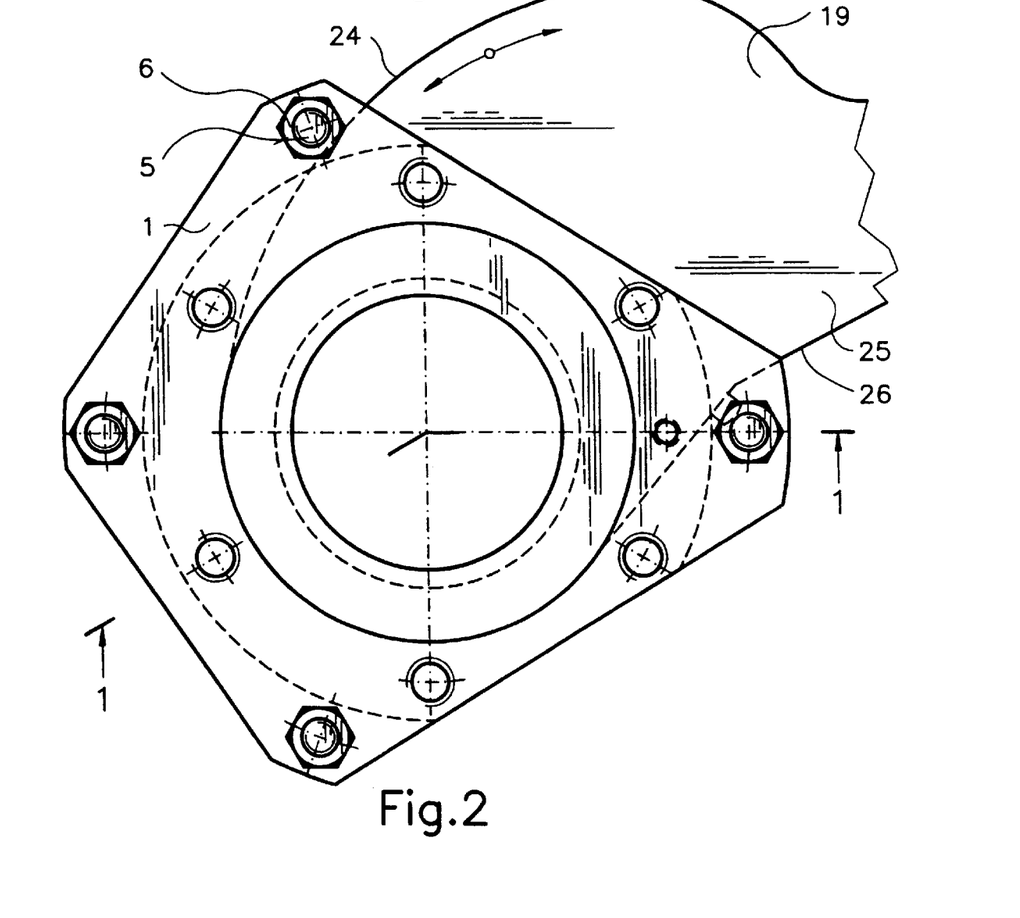
FIG. 2 shows a top view onto the cut-off diaphragm gate valve.
Figure 3:
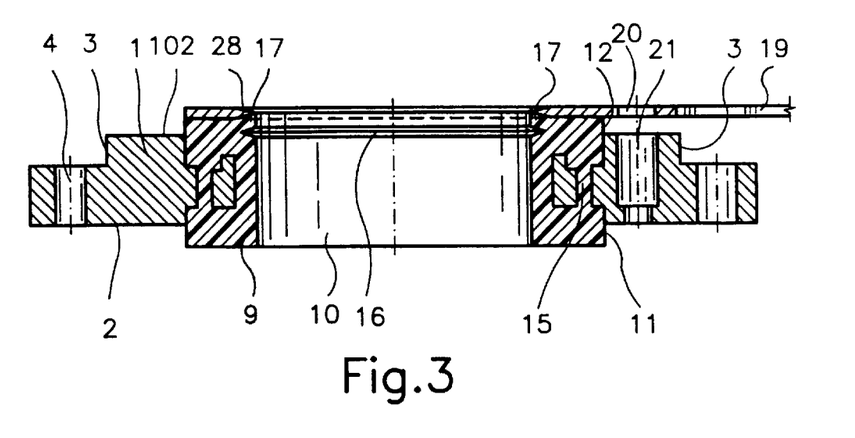
FIG. 3 shows a cross-sectional view of the cut-off diaphragm gate valve along section line 3—3 of FIG. 4 when one of the members is removed.
Figure 4:
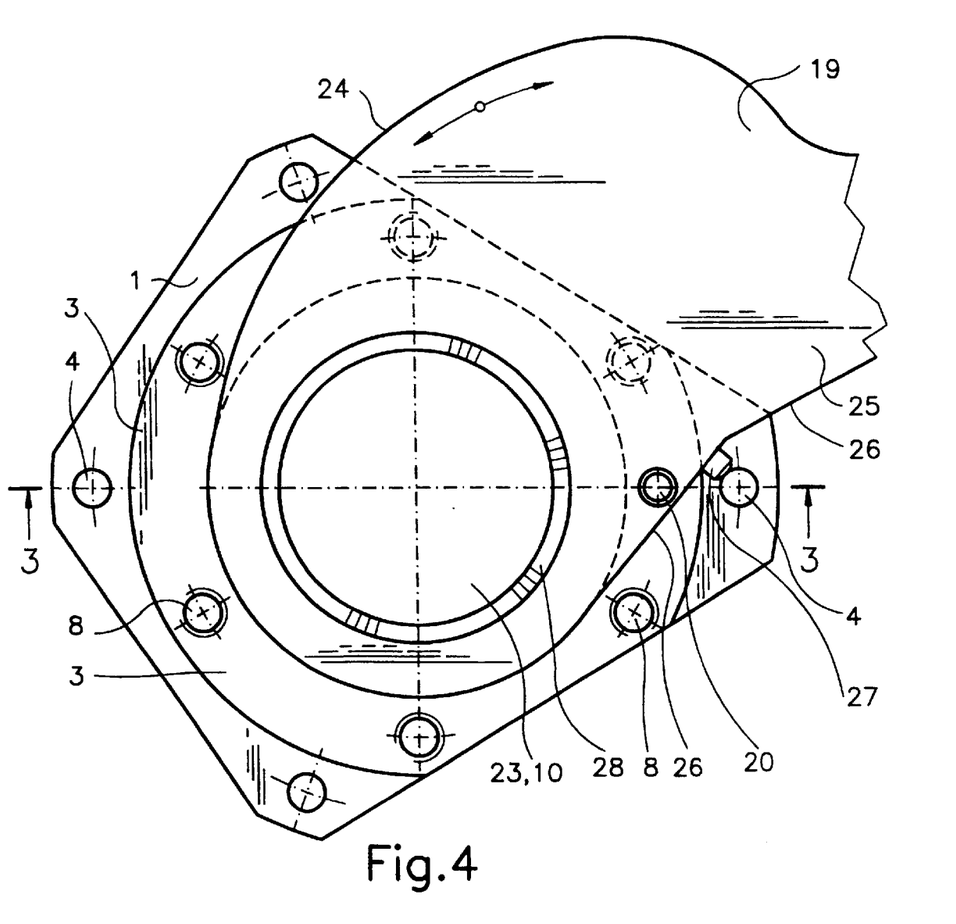
FIG. 4 shows a general top view onto the cut-off diaphragm gate valve when one of the members is removed, with a designated cross-sectional view of the diaphragm with an opening having a dual bevelling at an inner edge.
Figure 5:
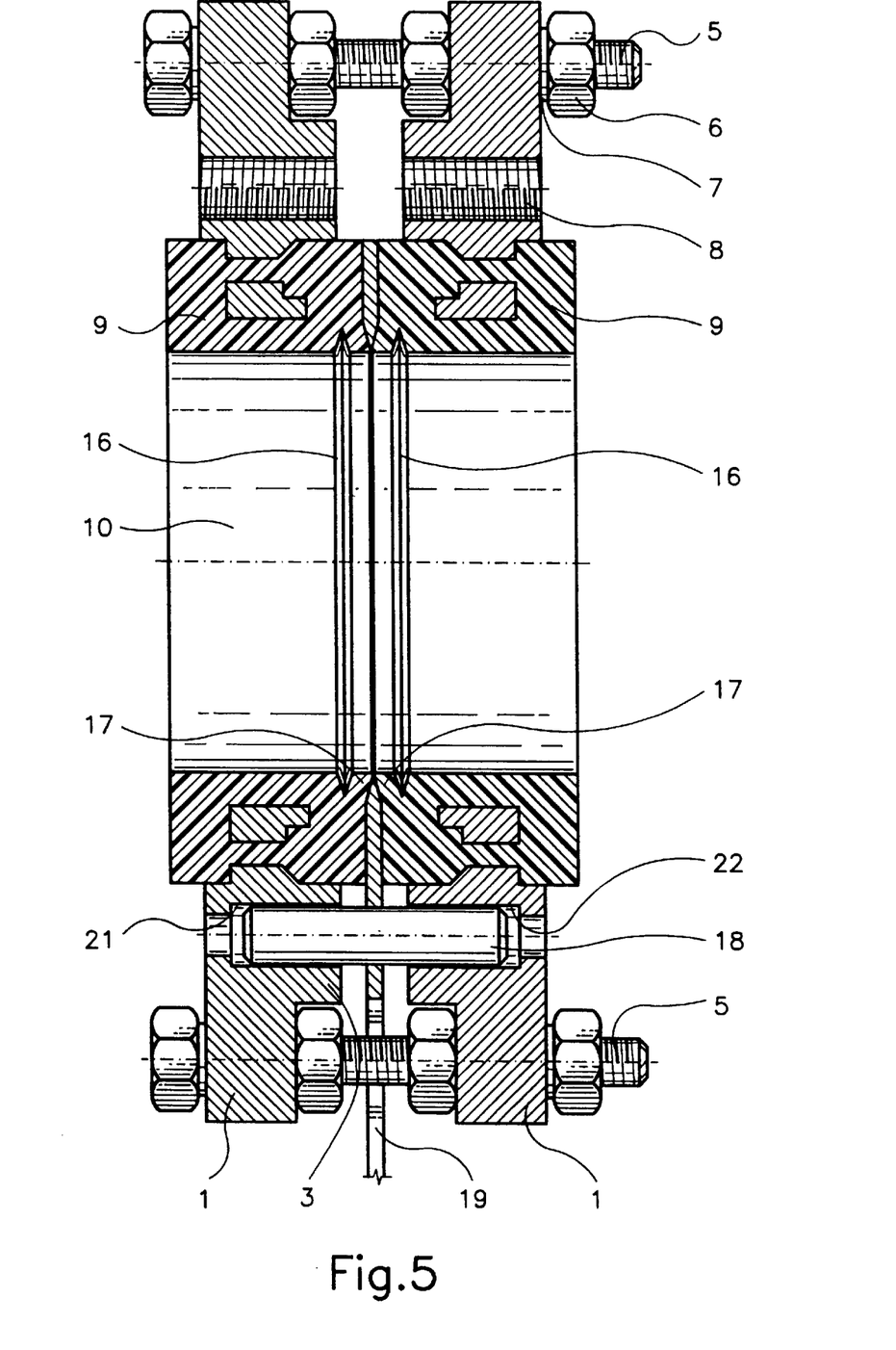
FIG. 5 shows a sectional view of a second embodiment of the valve of the present invention in an open position.
Figure 6:
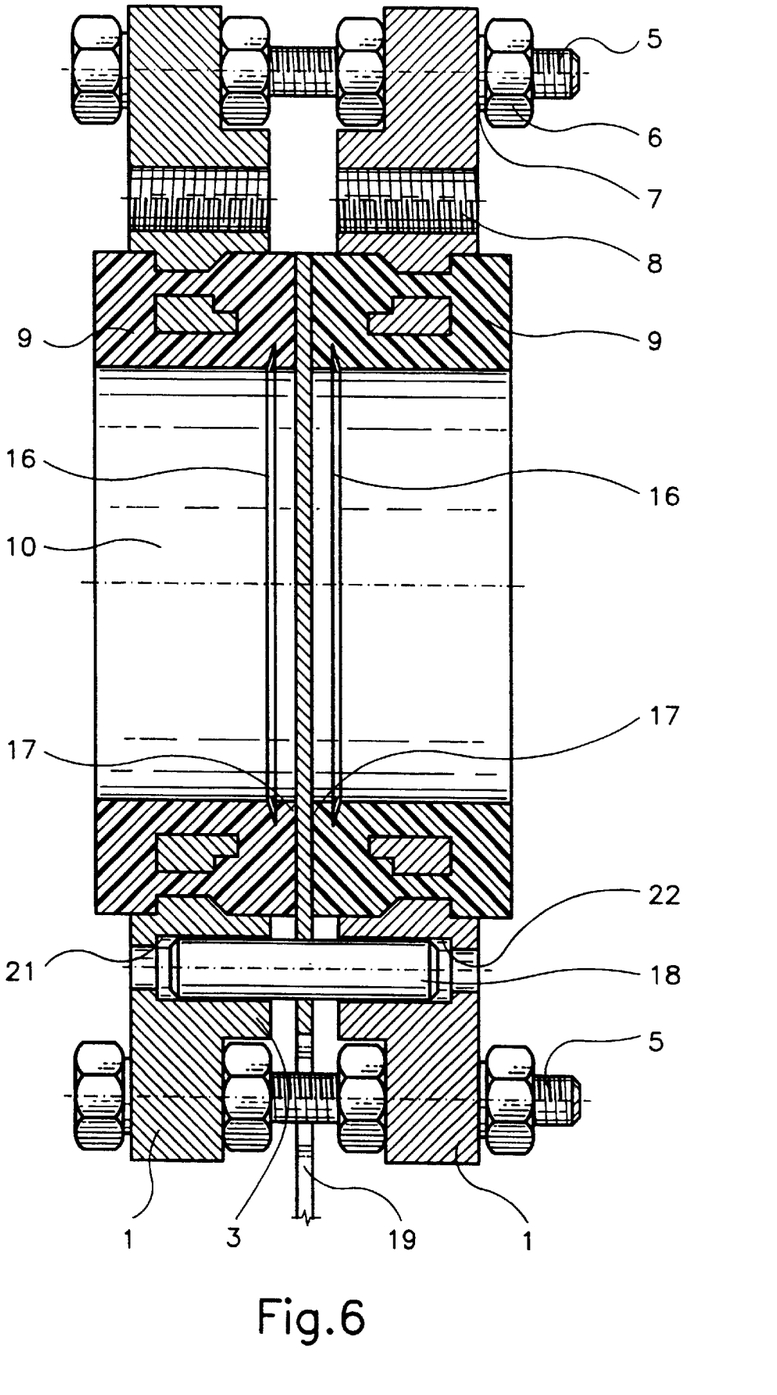
FIG. 6 shows a sectional view of the second embodiment of the valve of the present invention in a closed position.
Figure 7:
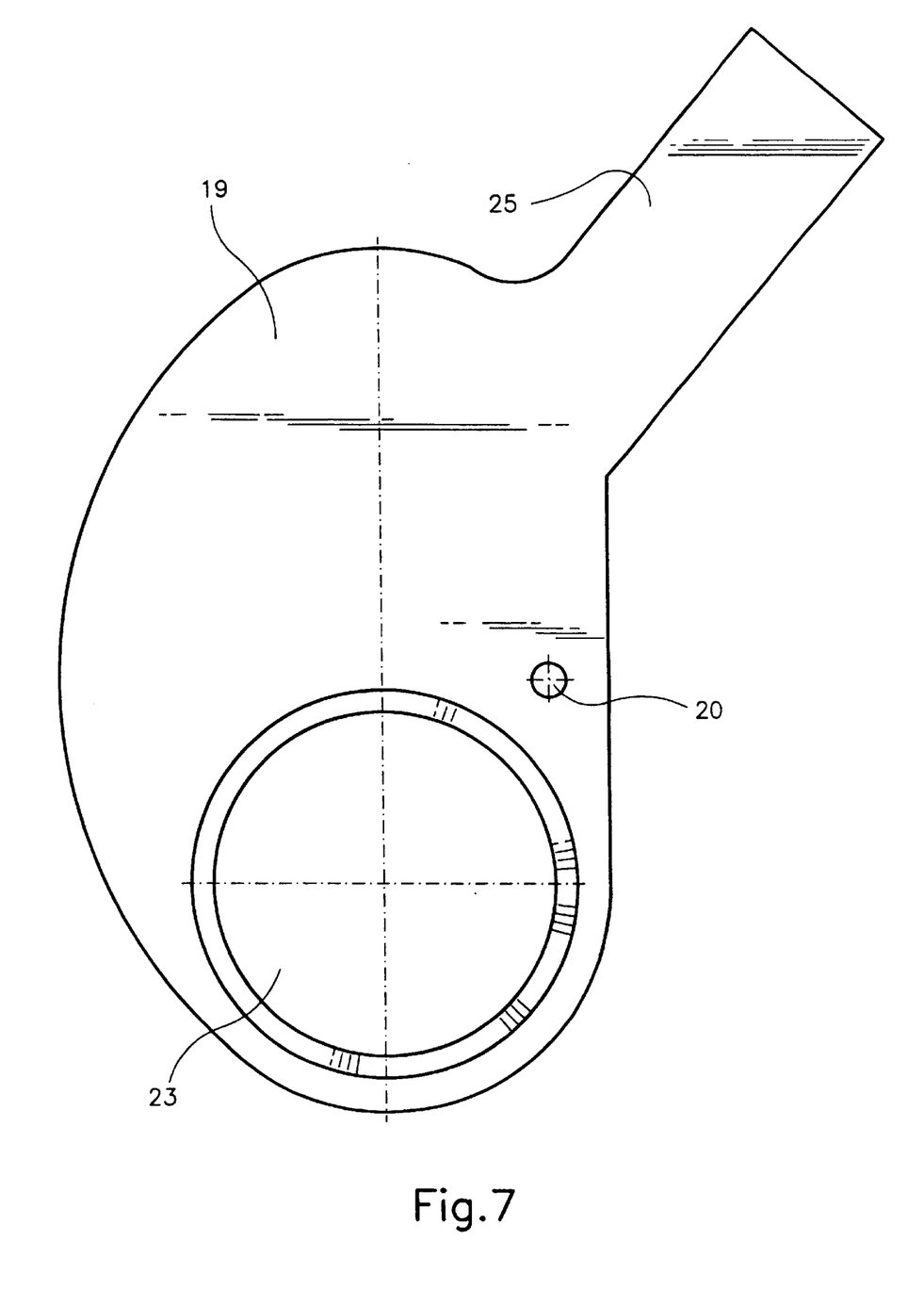
FIG. 7 is a top planar view of a diaphragm.

The diaphragm 19 has a profiled ridge 24 extending over the curvature of the ellipse starting at a handle 25, and the diaphragm 19 has straight and broken edges on the second side passing over into an edge of the handle 25. The control and limiting pin 27 is located on the side edge 26, which regulating and limiting pin 27 establishes the opening position of the gate valve. The elliptic curvature of the ridge 24 of the diaphragm 19 is adapted such that, during the turning of the diaphragm 19, the diaphragm 19 always passes toward the inside of the controlling screw 5 which is fitted in the corner of the member 1 disposed opposite to the side where the fixing pin 18 is disposed and behind the passage opening 10. The form of the diaphragm 19 is adapted such that, after performing a closing turn in counter-clockwise direction (FIG. 2) around the fixing pin 18, there is performed a completely sealing and leakproof covering of the passage opening 10 and a transport of liquid is closed off by the valve. An elongated lever is located on the handle 25 of the diaphragm 19, which elongated lever facilitates a performing of the desired turn of the diaphragm 19.

Preferably, the attachment openings 8 are furnished with internal threads. The screws 5 to be connected to the attachment openings 8 are to be of a limited length such as not to protrude on the inner side of the member 1 and not to protrude into the path of the moving diaphragm 19.

The radius of an edge of the circular sector of the diaphragm 19 has its center substantially at the position of an axis of the fixing pin 18. The radius of the circular sector of the diaphragm 19 can be for example from about 0.80 to 0.97 times the axial distance of the fixing pin 18 and of the control screw 5 closest thereto and is preferably from bout 0.9 to 0.95 times the axial distance of the fixing pin 18 and of the control screw 5 closest thereto.

Figure 8:
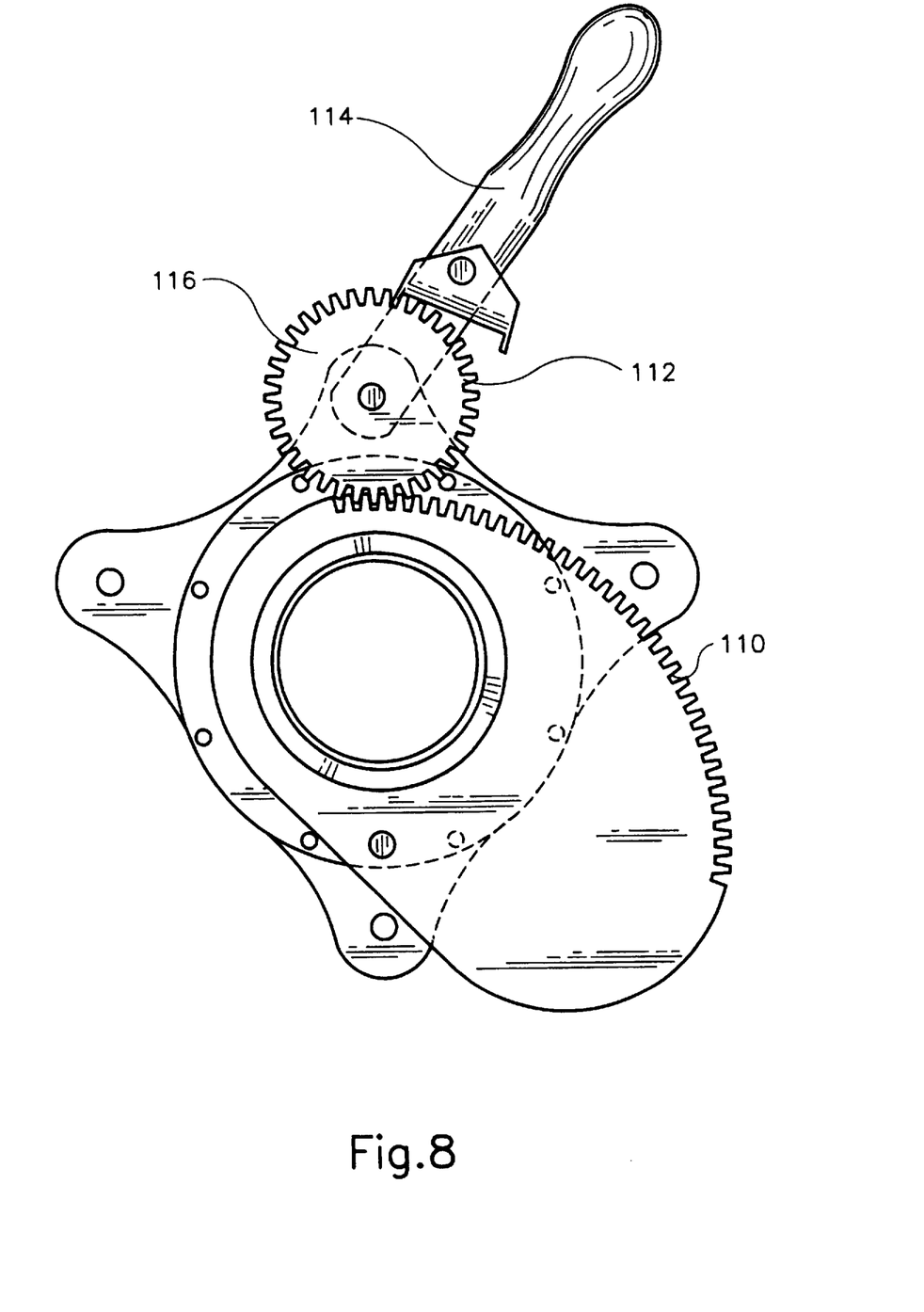
FIG. 8 is a top elevational view of a third embodiment including a gear drive of the diaphragm in an open position of the valve.
Figure 9:
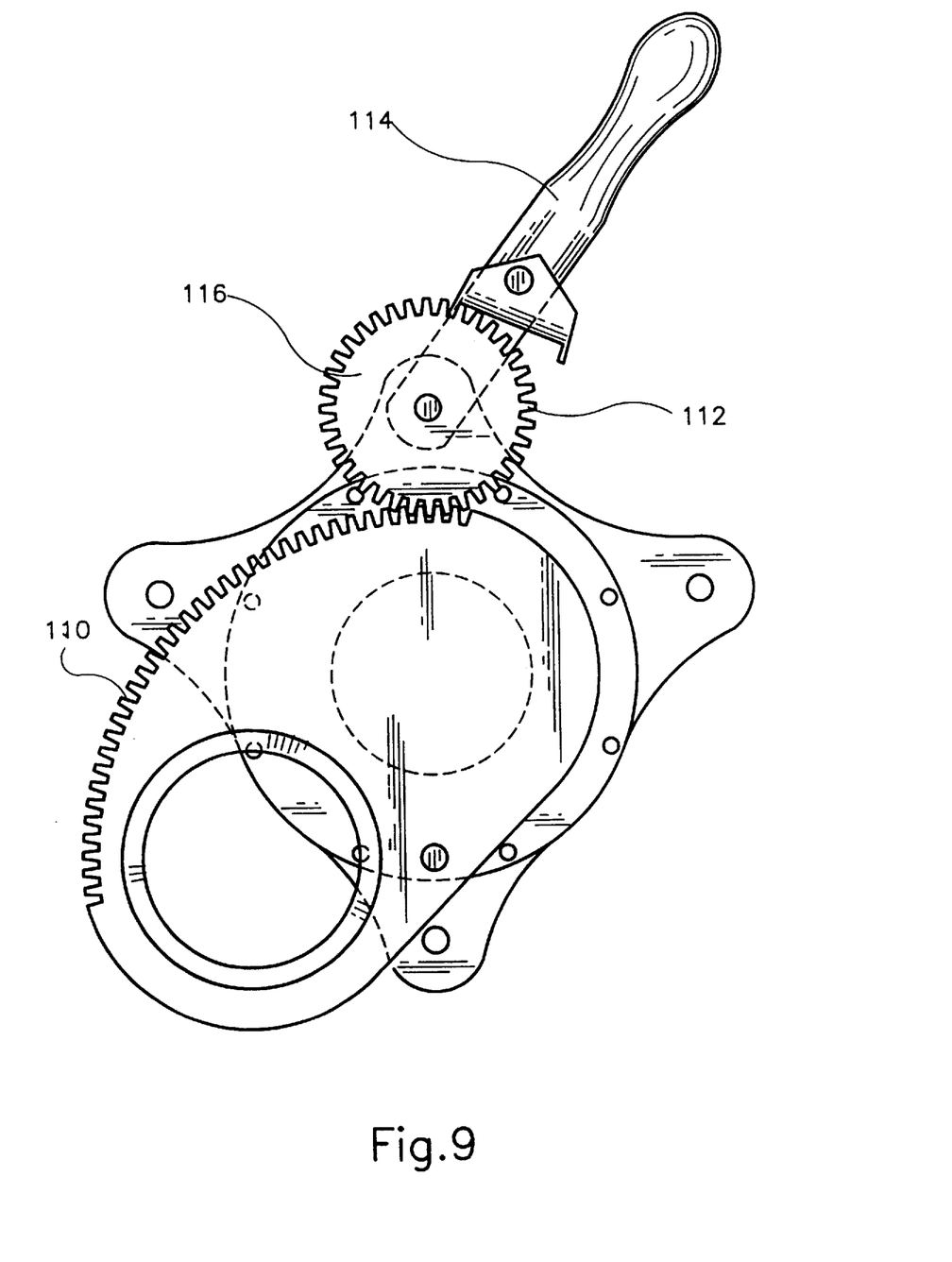
FIG. 9 is a top elevational view of the third embodiment including a gear drive of the diaphragm in a closed position of the valve.

FIGS. 8 and 9 show a further embodiment of the present invention allowing an ease of manual operation and/or automatic and controlled operation of the valve. The periphery of the diaphragm, having the shape of a circular sector, is furnished with gear teeth 110. These gear teeth 110 can be engaged by a counter gear wheel 116 having teeth 112 adapted to engage the gear teeth 110 of the diaphragm. The counter gear wheel 116 is manually actuated by a handle 114 according to FIGS. 8 and 9. The gear is constructed such that the force required to turn the diaphragm 19 around the pin 20 is substantially reduced. Alternatively, a drive axle of a servomotor can be connected to the counter gear wheel 116, thereby automatically actuating the diaphragm 19 based on current delivered to the servo motor. Furthermore, the arm of the lever 114 can for example be connected to an electromagnet for the purpose of an automatic control of the diaphragm 19 or the arm of the lever 114 can be connected to a servo motor of a hydraulic or of a pneumatic type.

This construction provides that in the absence of the present of material of the diaphragm 19 is located against the lip of the second gasket 9 and, in case the diaphragm is placed between the lip 17 of the second gasket, then the position of the lip 17 is substantially horizontal and parallel to the diaphragm 19. The closely parallel position of the lips 17 to the diaphragm 19 furnishes an effective sealing effect in view of the relatively small angle between the sealing lip 17 and the diaphragm 19.

The valve of the present invention can be repaired if necessary by replacing the gasket. For this purpose, the two members 1 are separated by unscrewing the screws 5 from the nuts 6. Then, the old gaskets are removed mechanically and/or chemically and the members 1 are reused with new gaskets 9. Gaskets 9 are provided by molding them around the members 1. The length of the gasket 9 in axial direction corresponds to from about 0.5 to 1.5 times the inner radius of the gasket and preferably from about 0.8 to 1.1 times the inner radius of the gasket 9.

It will be understood that each of the elements described above, or two or more together, may also find a useful application in other types of gate valves differing from the types described above.

While the invention has been illustrated and described as embodied in the context of a cut off diaphragm gate valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A cut-off diaphragm gate valve comprising
    a first annular member having an inner part and having an outer part;
    a first annular gasket having a first outer part, a first inner cylindrical surface with a first inner end and a first outer end, wherein the first inner part of the first annular member is embedded in the first outer part of the first annular gasket;
    first attachment means disposed in the first outer part of the first annular member;
    a first sealing lip disposed at the first inner end of the first annular gasket;
    a second annular member having a second inner part and having a second outer part;
    a second annular gasket having a second outer part, a second inner cylindrical surface with a second inner end and a second outer end, wherein the second inner part of the second annular member is embedded in the second outer part of the second annular gasket;
    second attachment means disposed in the second outer part of the second annular member;
    joining means attached to the first attachment means and to the second attachment means for holding the first annular member at a defined distance relative to the second annular member;
    a second sealing lip disposed at the second inner end of the of the second annular gasket, wherein the first sealing lip engages the second sealing lip in an open position of the valve such that flow can pass through an interior open space of the first annular gasket and through an interior open space of the second annular gasket;
    a fixed hinge pin attached between the first annular member and the second annular member and aligned in parallel to a common axis of the first annular gasket and of the second annular gasket;
    a diaphragm having a hinge opening disposed surrounding the fixed hinge pin and disposed between the first inner end of the first annular gasket and the second inner end of the second annular gasket and having a cylindrical opening disposed such that in a first position of the diaphragm the cylindrical opening is aligned with the first sealing lip and with the second sealing lip as to allow a flow through a circular opening defined by the first sealing lip and the second sealing lip and such that in a second position of the diaphragm a solid plate is disposed between the first sealing lip and the second sealing lip such as to prevent a flow through a circular obstruction formed by the diaphragm between the first sealing lip and the second sealing lip.

2. The cut-off diaphragm gate valve according to claim 1 further comprising a regulating screw;

nuts;

wherein the first attachment means is furnished by a first borehole aligned parallel to the common axis;

wherein the second attachment means is furnished by a second borehole aligned parallel to the common axis;

wherein the regulating screw passes through the first borehole and through the second borehole and wherein the regulating screw is fastened by the nuts.

3. The cut-off diaphragm gate valve according to claim 1 further comprising a regulating screw;

nuts;

wherein the first attachment means is furnished by a first borehole aligned parallel to the common axis;

wherein the second attachment means is furnished by a second threaded borehole aligned parallel to the common axis;

wherein the regulating screw passes through the first borehole and is threaded into the second borehole, and wherein the regulating screw is fastened by the nuts.

4. The cut-off diaphragm gate valve according to claim 1, wherein the first annular member is of a shape of a quadrangle having a mirror plane;

wherein the second annular member is of a shape of a quadrangle having a mirror plane;

wherein the first annular member and the second annular member are disposed opposite to each other;

wherein the first annular gasket is vulcanized to the first annular member;

wherein the second annular gasket is vulcanized to the second annular member;

wherein the diaphragm is seated rotatably around the fixed hinge pin;

a joining member for connecting the first attachment means to the second attachment means;

a limiting stop disposed on the diaphragm for engaging the joining member to limit a rotation of the diaphragm around the fixed hinge pin;

a mirror plane disposed between the first annular member and the second annular member such that the second annular member is substantially a mirror image of the first annular member.

5. The cut-off diaphragm gate valve according to claim 1 further comprising first mounting means disposed in the outer part of the first annular member;

a first flat outer front surface furnished at an outer end of the first annular gasket and extending parallel to the common axis;

a first annular head projection furnished at a first inner end of the first annular member and having a shape of a first ring-shaped orifice;

a first circumferential groove disposed in the first ring-shaped orifice;

second mounting means disposed in the outer part of the second annular member;

a second flat outer front surface furnished at an outer end of the second annular gasket and extending parallel to the common axis;

a second annular head projection furnished at a second inner end of the second annular member and having a shape of a second ring-shaped orifice;

a second circumferential groove disposed in the second ring-shaped orifice.

6. The cut-off diaphragm gate valve according to claim 5, further comprising a central passage opening defined by the first annular gasket and by the second annular gasket;

a first outer cylindrical collar furnished at the first annular gasket, wherein the first outer cylindrical collar is disposed farther away from the first sealing lip in an axial direction as compared to a position of the first flat outer front surface;

a first flat inner cylindrical collar furnished at the first annular gasket, wherein the first flat inner cylindrical collar is disposed close to the first sealing lip in an axial direction as compared to a position of the first annular head projection;

a first ring-shaped tongue of the first annular gasket disposed in the first circumferential groove;

a second outer cylindrical collar furnished at the second annular gasket, wherein the second outer cylindrical collar is disposed farther away from the second sealing lip in an axial direction as compared to a position of the second flat outer front surface;

a second flat inner cylindrical collar furnished at the second annular gasket, wherein the second flat inner cylindrical collar is disposed close to the second sealing lip in an axial direction as compared to a position of the second annular head projection;

a second ring-shaped tongue of the second annular gasket disposed in the second circumferential groove.

7. The cut-off diaphragm gate valve according to claim 6, further comprising a first "V"-shaped circumferential groove for forming the first sealing lip on a surface of the first flat inner cylindrical collar, and wherein the first sealing lip slightly protrudes above the surface of the first flat inner cylindrical collar;

a second "V"-shaped circumferential groove for forming the second sealing lip on a surface of the second flat inner cylindrical collar, and wherein the second sealing lip slightly protrudes above the surface of the second flat inner cylindrical collar.

8. The cut-off diaphragm gate valve according to claim 6, further comprising a first cylindrical casting opening disposed in the first annular member and connected to the first circumferential groove;

a first cast ingot disposed in the first cylindrical casting opening and attached to the first annular gasket;

a second cylindrical casting opening disposed in the second annular member and connected to the second circumferential groove;

a second cast ingot disposed in the second cylindrical casting opening and attached to the second annular gasket.

9. The cut-off diaphragm gate valve according to claim 6, wherein the diaphragm exhibits a uniform thickness and wherein a distance between the first flat inner cylindrical collar furnished at the first annular gasket and the second flat inner cylindrical collar furnished at the second annular gasket is from about 0.95 to 1.0 times the thickness of the diaphragm.

10. The cut-off diaphragm gate valve according to claim 1, wherein a diameter of the cylindrical opening of the diaphragm is equal to an inner diameter of the first annular gasket and of the second annular gasket; further comprising an outer edge disposed at the diaphragm extending on one periphery of the diaphragm with a curvature like an ellipse and on an oppositely disposed periphery of the diaphragm with a straight and angled periphery;

a handle attached to the diaphragm and joining both the periphery of the diaphragm with a curvature like an ellipse and the oppositely disposed periphery of the diaphragm with a straight and angled periphery;

oblique bevels surrounding the cylindrical opening of the diaphragm, wherein the oblique bevels extend sealingly locking sealing surfaces of the sealing lip.

11. The cut-off diaphragm gate valve according to claim 1, wherein a diameter of the cylindrical opening of the diaphragm is equal to 1.001 to 1.02 times an inner diameter of the first annular gasket and of the second annular gasket; further comprising an outer edge disposed at the diaphragm extending on one periphery of the diaphragm with a curvature like a segment of a circle, and on an oppositely disposed periphery of the diaphragm with a straight and angled periphery;

a handle attached to the diaphragm and joining both the periphery of the diaphragm with a curvature like an ellipse and the oppositely disposed periphery of the diaphragm with a straight and angled periphery;

dual bevels adjoining each other and surrounding the cylindrical opening of the diaphragm, wherein the bevels form an angle of from about 10 to 50 degrees with a plane disposed perpendicular to the common axis.

12. A cut-off diaphragm gate valve furnished with regulating screws with nuts, washers and a fixed pin, wherein the gate valve has two members (1) of a shape of a quadrangle and located opposite to each other in mirror image, which members (1) are in part immersed in a profiled gasket (9), which gasket (9) is vulcanized together with the members (1), with a profiled diaphragm (19) nested between them, wherein the diaphragm (19) is seated rotatably on the fixed pin (18), and wherein a regulating and limiting pin (27) is located at a side edge (26) of the diaphragm (19).

13. The cut-off gate valve according to claim 12, wherein each one of the two members (1) is furnished at one side with a flat front face (2) and at a second side with a head projection (3) in a form of a ring-shaped orifice, and wherein a circumferential groove (14) is disposed in the ring-shaped orifice.

14. The cut-off gate valve according to claim 12, wherein the profiled gasket (9) includes a central passage opening (10) and an outer cylindrical collar (11) and an inner cylindrical collar (12) which cylindrical collars (11) and (12) are correspondingly disposed at the flat front face (2) coordinated to them and above the head projection (3) in the member (1) at which the cylindrical collar (12) contains a ring-shaped tongue (13), which ring-shaped tongue (13) is fixedly seated in the groove (14) assigned to the ring-shaped tongue (13), and which groove (14) is disposed in the member (1) and wherein the gasket (9) is furnished with a circumferential groove (16) having a cross-sectional form of the letter "V", and whereby a sealing lip (17) is furnished on the surface of the circumferential collar (12), which sealing lip (17) slightly protrudes above the inner flat surface of the cylindrical collar (12).

15. The cut-off gate valve according to claim 12, wherein the profiled diaphragm (19) exhibits a cylindrical opening (23) of a diameter equal to a diameter of the central passage opening (10) in the profiled gasket (9), and wherein the diaphragm (19) exhibits a profiled outer edge (24) extending on one side, which is curved as an ellipse, into a handle (25) and has straight and broken edges (26) on a second side extending also into the handle (25), wherein oblique bevels (28) are disposed around the cylindrical opening (23) of the diaphragm (19), wherein the oblique bevels (28) extend sealingly locking a sealing surface of the sealing lip (17).

16. A method of producing a cut-off gate valve comprising the steps:

forming a first annular member having an inner part and having an outer part together with first attachment means disposed in the first outer part of the first annular member;

casting a first annular gasket having a first outer part, a first inner cylindrical surface with a first inner end and a first outer end, wherein the first inner part of the first annular member is embedded in the first outer part of the first annular gasket together with a first sealing lip disposed at the first inner end of the of the first annular gasket;

forming a second annular member having a second inner part and having a second outer part together with second attachment means disposed in the second outer part of the second annular member;

casting a second annular gasket having a second outer part, a second inner cylindrical surface with a second inner end and a second outer end, wherein the second inner part of the second annular member is embedded in the second outer part of the second annular gasket together with a second sealing lip disposed at the second inner end of the of the second annular gasket;

placing a diaphragm, having a hinge opening disposed surrounding the hinge pin, and disposed between the first inner end of the first annular gasket and the second inner end of the second annular gasket, and having a cylindrical opening disposed such that in a first position of the diaphragm the cylindrical opening is aligned with the first sealing lip and with the second sealing lip so as to allow a flow through a circular opening defined by the first sealing lip and the second sealing lip and such that in a second position of the diaphragm a solid plate is disposed between the first sealing lip and the second sealing lip such as to prevent a flow through a circular obstruction formed by the diaphragm between the first sealing lip and the second sealing lip;

attaching a fixed hinge pin between the first annular member and the second annular member and aligning in parallel to a common axis of the first annular gasket and of the second annular gasket;

holding the first annular member together at a defined distance relative to the second annular member with joining means attached to the first attachment means and to the second attachment means such that the first sealing lip engages the second sealing lip in an open position of the valve such that a flow can pass through an interior open space of the first annular gasket and through an interior open space of the second annular gasket.

* * * * *